US008297799B2

(12) United States Patent
Chou

(10) Patent No.: US 8,297,799 B2
(45) Date of Patent: Oct. 30, 2012

(54) OMNIDIRECTIONAL LED LAMP AND COMPLEX, UNITARY LENS

(75) Inventor: Yen-Chun Chou, Taipei (TW)

(73) Assignee: Aether Systems Inc., Taipei (TW)

( * ) Notice: Subject to any disclaimer, the term of this patent is extended or adjusted under 35 U.S.C. 154(b) by 109 days.

(21) Appl. No.: 12/958,560

(22) Filed: Dec. 2, 2010

(65) Prior Publication Data

US 2012/0140486 A1 Jun. 7, 2012

(51) Int. Cl.
*F21V 3/00* (2006.01)
*F21V 5/00* (2006.01)
*F21V 5/04* (2006.01)
*G02B 13/06* (2006.01)

(52) U.S. Cl. .................... 362/311.02; 362/335; 359/725

(58) Field of Classification Search ........................ None
See application file for complete search history.

(56) References Cited

U.S. PATENT DOCUMENTS 1,977,689 A * 10/1934 Muller .......................... 362/327
2,254,961 A * 9/1941 Harris ........................... 362/327
2,362,176 A * 11/1944 Swanson ....................... 313/110
6,598,998 B2 * 7/2003 West et al. .................... 362/307
6,679,621 B2 1/2004 West et al.
7,034,343 B1 * 4/2006 Kim et al. ....................... 257/98
7,142,769 B2 * 11/2006 Hsieh et al. ................... 362/327
7,753,561 B2 * 7/2010 Chaves et al. ............ 362/311.06
8,118,457 B2 * 2/2012 Kanai .......................... 362/335
2011/0110093 A1 5/2011 Hsu

FOREIGN PATENT DOCUMENTS

CN 201568778 U1 9/2010

* cited by examiner

*Primary Examiner* — Anh Mai
*Assistant Examiner* — Britt D Hanley
(74) *Attorney, Agent, or Firm* — Lowe Hauptman Ham & Berner LLP

(57) ABSTRACT

An omnidirectional LED lamp is designed with a complex lens covering a light source. The light source is a light emitted diode chip or a light emitted diode lamp or package. The complex lens is composed of a top center lens, a wing lens, and a tube lens. The top center lens modifies the light beams to shed lights above the lamp, the wing lens surrounds and connects with the top center lens to modify the light beams to shed lights on side bottom of the lamp, and the tube lens is configured under the wind lens and connects to the wing lens to modify the light beams to shed lights on side top of the lamp. The complex lens modifies light beams from a light source to shed light on full directions.

10 Claims, 10 Drawing Sheets

OMNIDIRECTIONAL LED LAMP AND COMPLEX, UNITARY LENS

FIELD OF THE INVENTION

This invention relates to a light emitted diode (LED) lamp, especially an omnidirectional LED lamp which is configured with a complex lens to modify light beams from the light emitted diode to emit light beams in full direction like a traditional light bulb.

BACKGROUND

FIG. 1 is a prior art

A traditional LED lamp is shown in FIG. 1 where an LED chip 11 is mounted on a circuit board 10. When the LED chip 11 is energized, the bulb sheds light beams hemispherically or, nearly 180 degree in a section view. This hemispheric illumination lamp of FIG. 1 is not good to be used as a light source for a decorative lamp such as a ceiling lamp which is covered by a lampshade. A lampshade is a fixture that covers a light bulb on a lamp to diffuse the light beams it emits. A decorative lamp is usually configured with a lampshade that could be transparent or semi-transparent one and with a special outline design. In order to display the beauty of the lampshade, light beams should have to shed on most of the lampshade, an omnidirectional light source such as a traditional tungsten lamp is chosen to be used as the light source. The LED lamp as shown in FIG. 1 is not a good candidate to be used as the light source.

FIG. 2 is another prior art

A tungsten lamp is shown in FIG. 2 which is one of the traditional incandescent lamps. The tungsten lamp 12 has a full directional illumination capability, nearly 360 degree illumination in section view, which is a right choice to be used as a light source for a decorative lamp mentioned above. LED technology has been well developed in recent years. Data shows that LED lamps save 80% energy than incandescent lamps, 50% energy saving than fluorescent lamps. LED lamps have the advantages on energy saving and environmental protection, and have become a major trend of development in the lighting field. It is long desired if an omnidirectional LED lamp can be figured out to replace traditional incandescent lamps such as tungsten lamps with low energy efficient.

DETAILED DESCRIPTION OF EMBODIMENTS

An omnidirectional LED lamp is designed to include a complex lens and an LED light source. The complex lens is composed of three lens components:

a top center lens, refracts a first group of light beams from the LED for a first fan-out area to illuminate top spaces of the complex lens;

a wing lens, designed to have a property of total internal reflection capability and configured in the peripheral of the top center lens, reflects a second group of light beams from the LED for a second fan-out area to cover side bottom spaces of the complex lens; and a tube lens, configured on bottom of said wing lens, refracts a third group of light beams from the LED for a third fan-out area to cover side top spaces of the complex lens.

The first fan-out area, second fan-out area, and third fan-out area creates an omnidirectional illumination LED lamp which gives nearly 360 degree illumination in section view.

Figure 1:
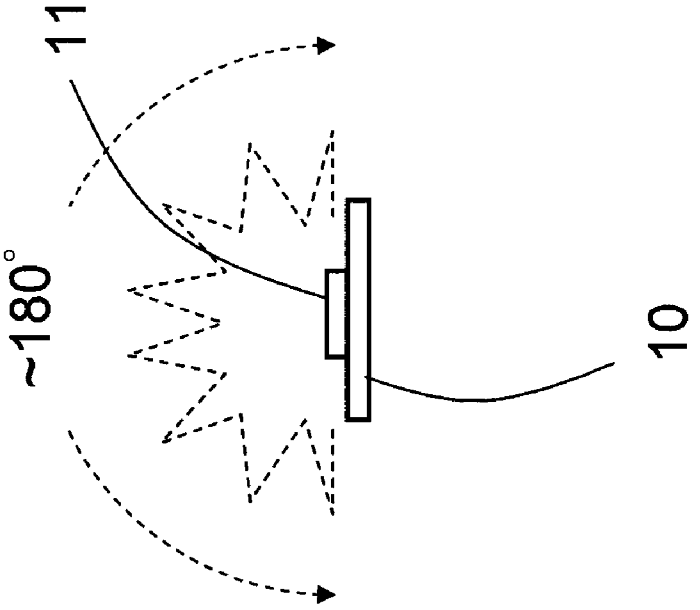
Fig.1 Prior Art
FIG. 1 is a prior art.
Figure 2:
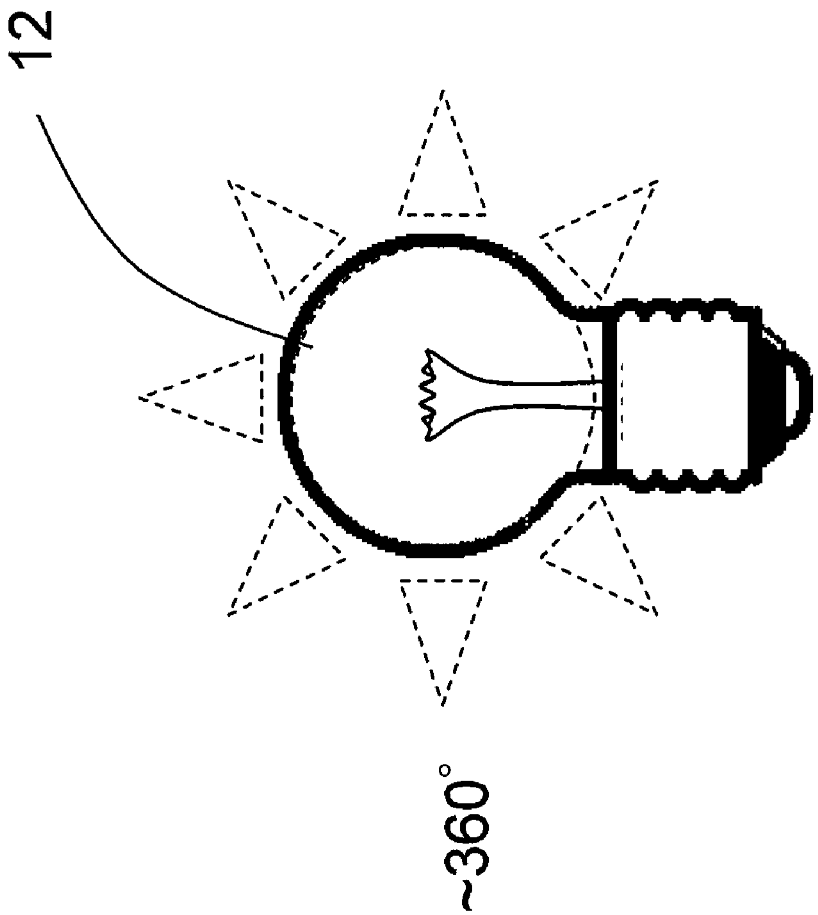
Fig.2 Prior Art
FIG. 2 is another prior art.
Figure 3:
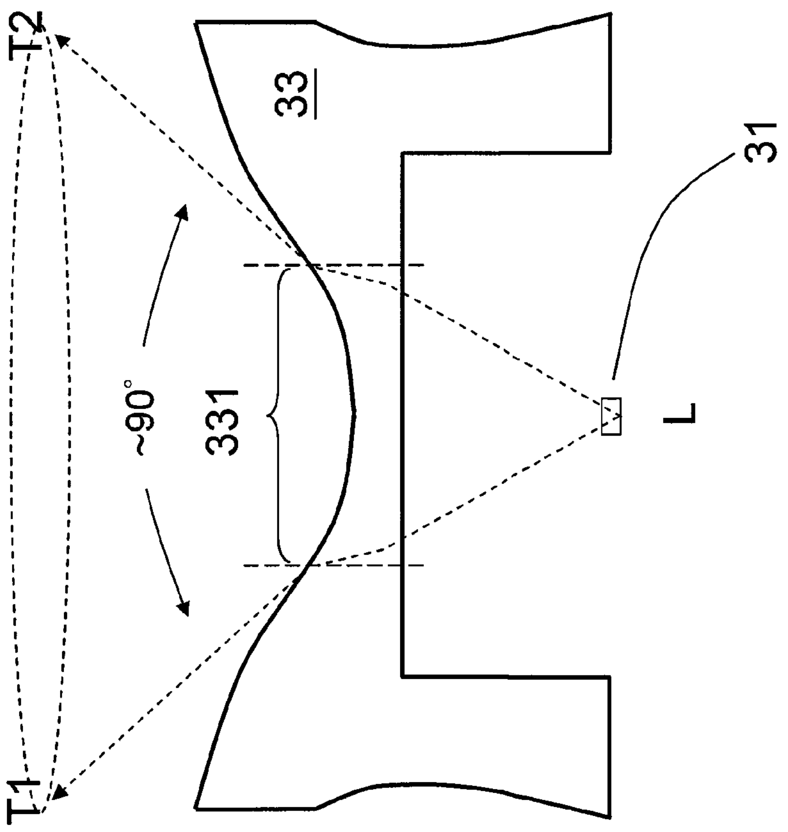
FIG. 3 shows a first fan-out area of light beams from a top center lens of a complex lens according to the invention.

FIG. 3 shows a first fan-out area of light beams from a top center lens of a complex lens according to the invention.

FIG. 3 shows a complex lens 33 with a top center lens 331, the top center lens 331 is a concave lens which modifies light beams from an underside LED 31 to fan out and sheds lights on top of the complex lens 33 to cover a conical region as shown between the lines $LT_1$ and $LT_2$ in section view. The span angle of the conical region is nearly 90 degree in section view. The first fan-out area covers 0~45 degree and 315~360 degree in section view.

Figure 4:
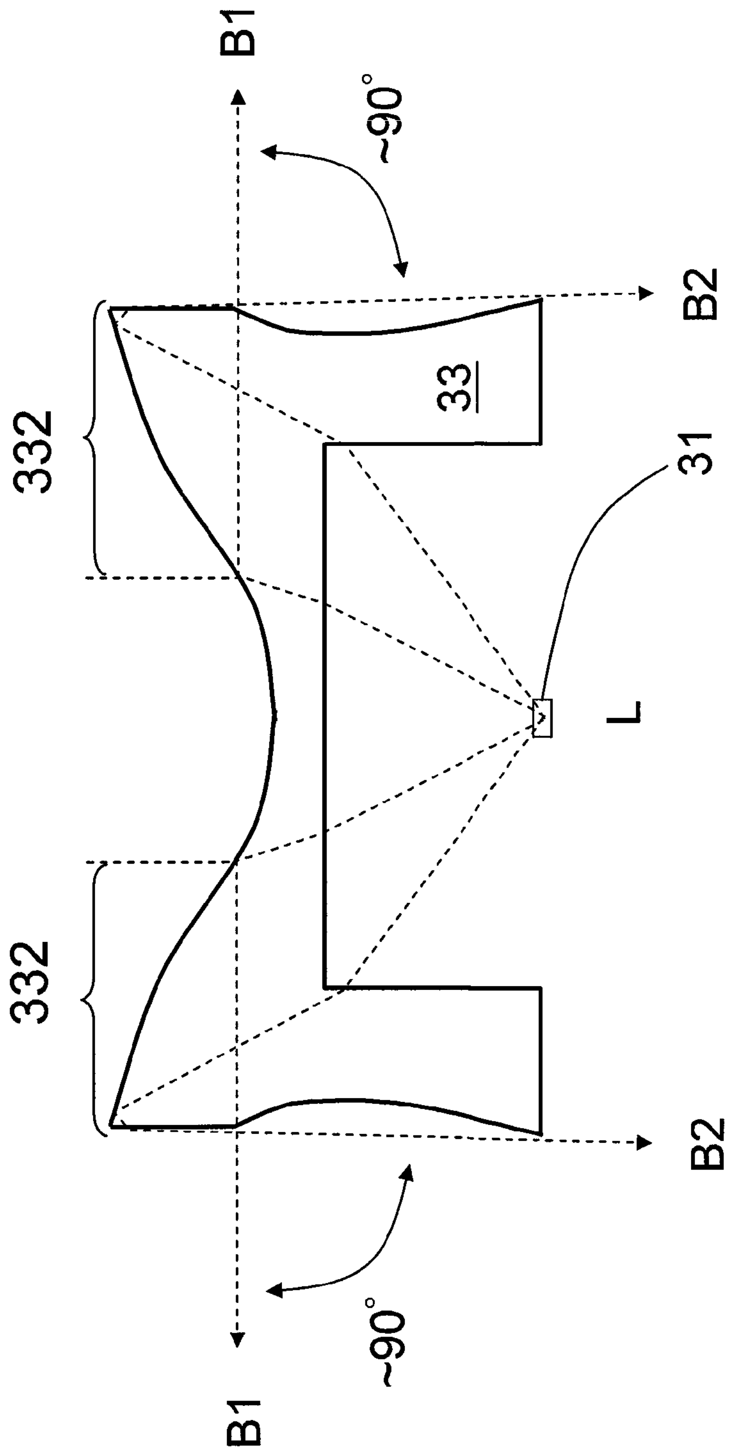
FIG. 4 shows a second fan-out area of light beams from a wing lens of a complex lens according to the invention.

FIG. 4 shows a second fan-out area of light beams from a wing lens of a complex lens according to the invention.

FIG. 4 shows a complex lens 33 with a wing lens 332 extending from the top center lens 331, the wing lens 331 is a concave lens which surrounds and connects peripherally to the top center lens 331. The wing lens 332 is a total internal reflection (TIR) lens which modifies light beams from an underside LED 31 to fan out and sheds lights on side bottom of the complex lens 33 to cover a conical region as shown between the lines $LB_1$ and $LB_2$ in section view. The span angle of the conical region is nearly 90 degree in section view. The second fan-out area covers 90~180 degree and 180-270 degree in section view.

Figure 5:
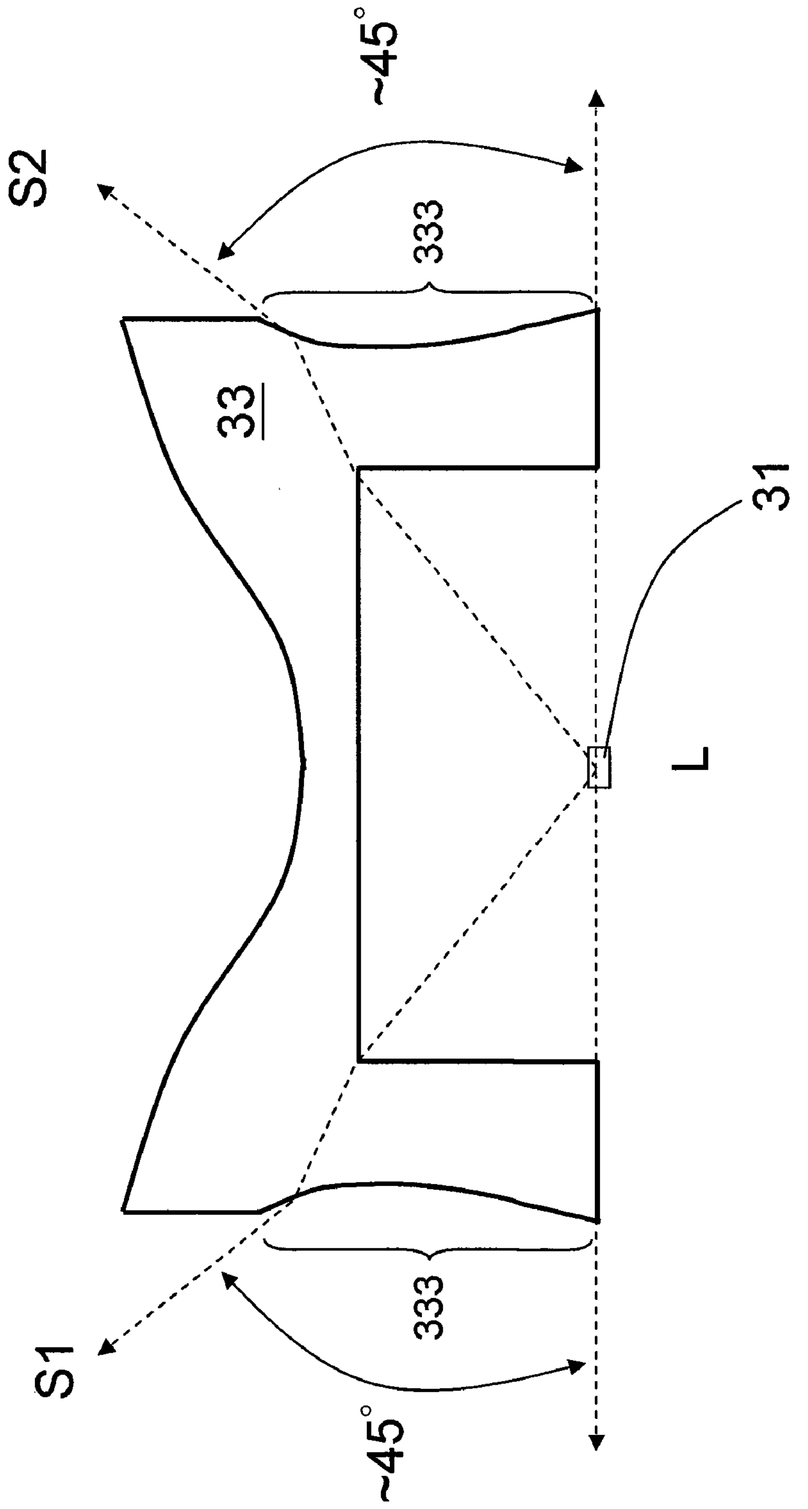
FIG. 5 shows a third fan-out area of light beams from a tube lens of a complex lens according to the invention.

FIG. 5 shows a third fan-out area of light beams from a tube lens of a complex lens according to the invention.

FIG. 5 shows a complex lens 33 with a tube lens 333 connected to the bottom of the wing lens 332. the tube lens 333 modifies light beams from an underside LED 31 to fan out and sheds lights on side top of the complex lens 33 to cover a conical region as shown between the lines $LS_1$ and $LS_2$ in section view. The span angle of the conical region is nearly 45 degree in section view. The third fan-out area covers 45~90 degree and 270~315 degree in section view.

The first fan-out area covers 0~45 degree and 315~360 degree, the second fan-out area covers 90~180 degree and 180~270 degree, and the third fan-out area covers 45~90 degree and 270~315 degree. The combination of the first fan-out area, the second fan-out area, and the third fan-out area creates an omnidirectional illumination or 360 degree illumination in section view.

Figures 6A, 6B, 6C:
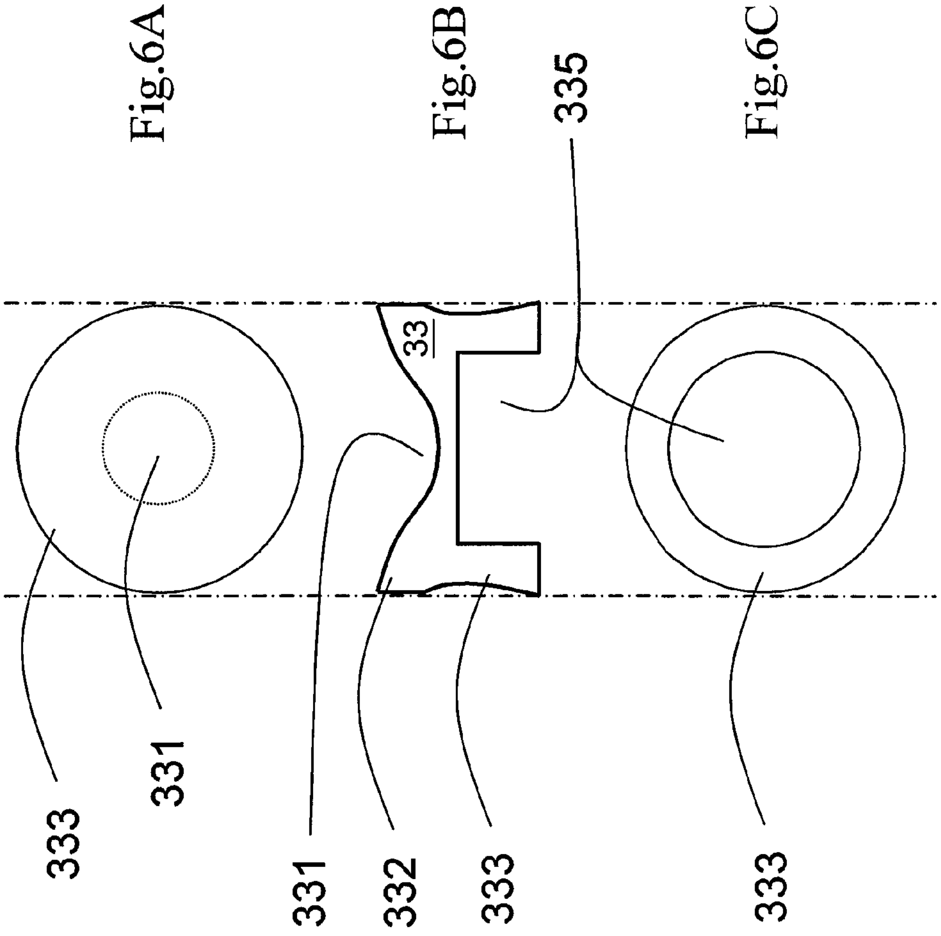
FIG. 6A shows a top view of the complex lens according to the invention.
FIG. 6B shows a section view of the complex lens according to the invention.
FIG. 6C shows a section view of the complex lens according to the invention.

FIG. 6A shows a top view of the complex lens according to the invention.

FIG. 6A shows a top center lens 331 and a peripheral wing lens 332 configured on top portion of the complex lens 33.

FIG. 6B shows a section view of the complex lens according to the invention.

FIG. 6B shows an M shaped structure lens which includes a top center lens 331, a peripheral wing lens 332 surrounding the top center lens 331, and a tube lens 333 under the wing lens 332. In addition, a center recess 335 is under the top center lens 331 and is surrounded by the tube lens 333.

FIG. 6C shows a section view of the complex lens according to the invention.

FIG. 6C it shows a tube lens 333 configured under the wing lens 332. A bottom center recess 335 is configured under the top center lens 331.

Figure 7:
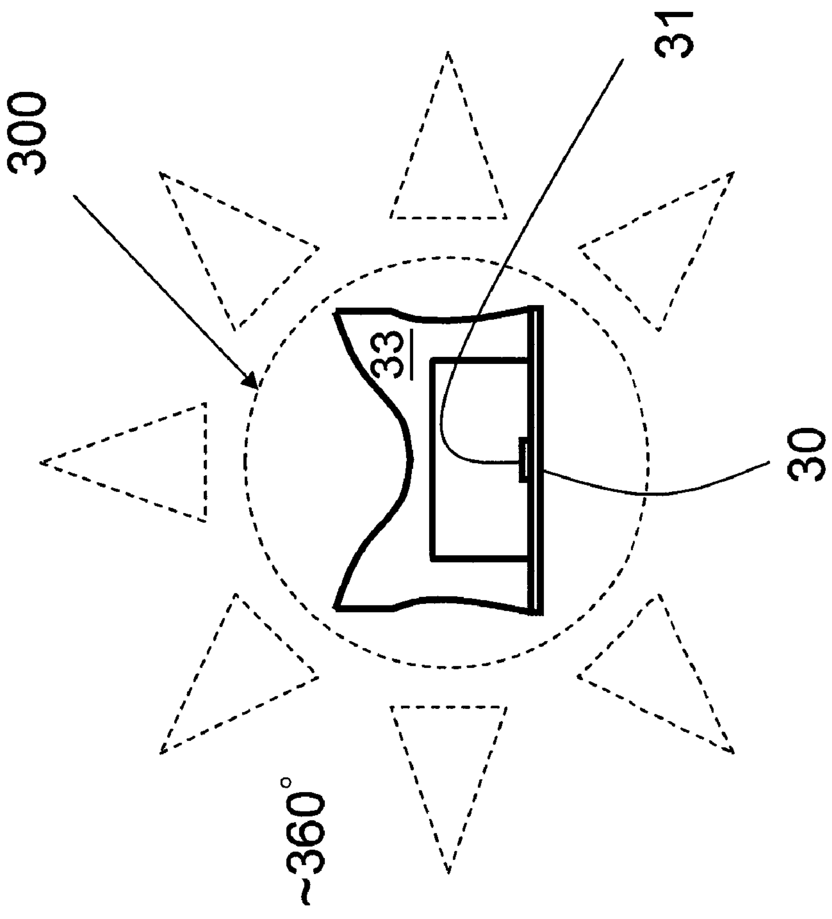
FIG. 7 shows a first embodiment of an omnidirectional LED lamp according to the invention.

FIG. 7 shows a first embodiment of an omnidirectional LED lamp according to the invention.

FIG. 7 is a section view of a first embodiment of an omnidirectional LED lamp according to the invention. An omnidirectional LED lamp package 300 includes an LED 31 and a circuit board 30. The LED 31 is mounted on a circuit board 30. A complex lens 33 is fixed on the circuit board 30 with a bottom center recess 335 housing the LED 31 underside. Due to the full directional modification capability of the complex lens 33, the omnidirectional LED lamp package 300 sheds lights in full direction, or nearly 360 degree in section view.

Figures 8A, 8B, 8C:
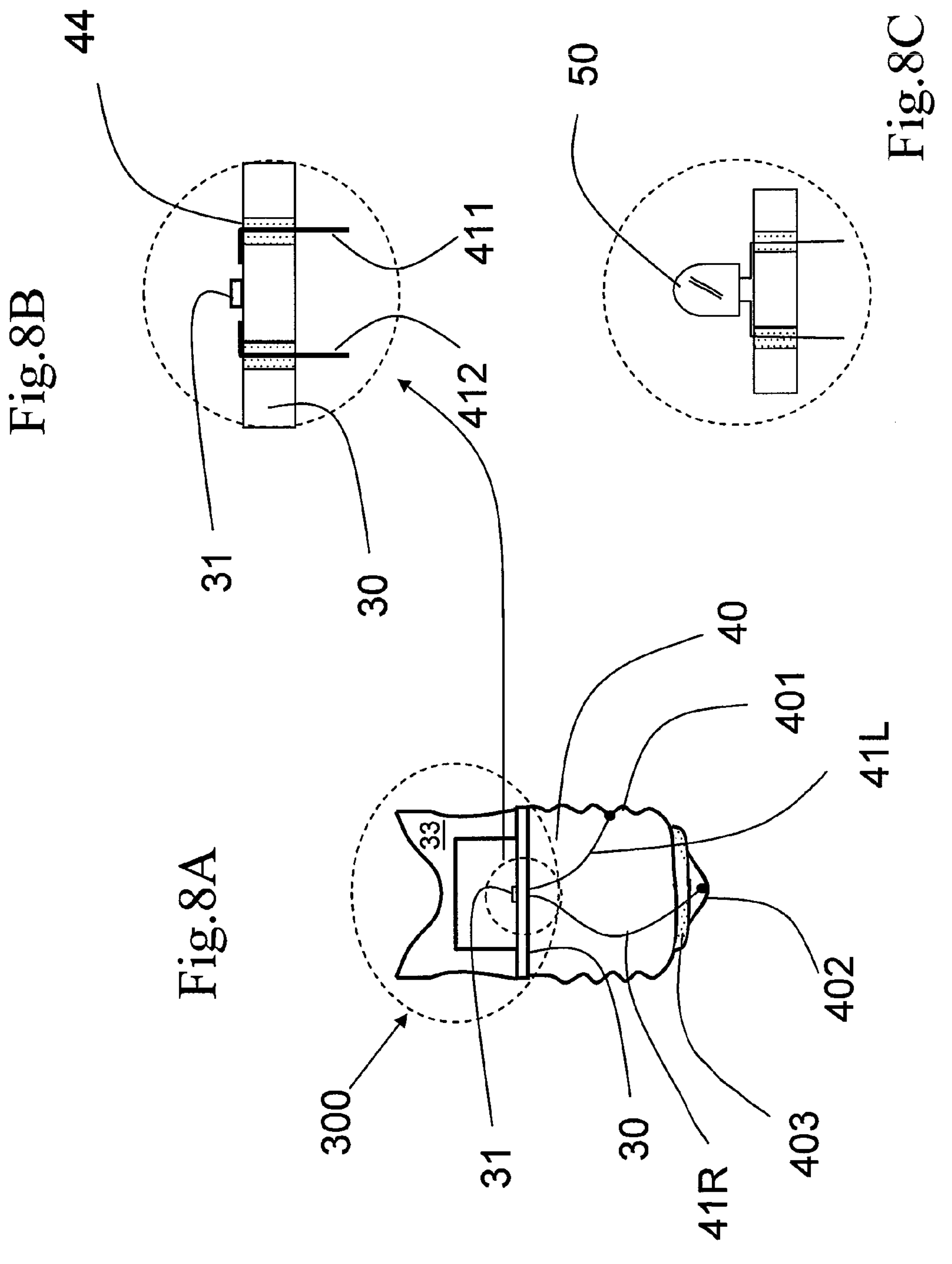
FIG. 8A shows a second embodiment of an omnidirectional LED lamp according to the invention.
FIG. 8B shows an LED chip used in FIG. 8A according to the invention.
FIG. 8C shows an LED lamp is used to replace the chip of FIG. 8B according to the invention.

FIG. 8A shows a second embodiment of an omnidirectional LED lamp according to the invention.

FIG. 8A is a section view of a second embodiment, an omnidirectional LED lamp. FIG. 8A shows that a socket 40 is configured under the circuit board 30. The socket 40 has a wall metal 401 and a bottom metal 402. An insulation layer 403 is configured for electrical insulation in between the wall metal 401 and the bottom metal 402. The LED 31 has a first electrode (not shown in the figure) electrically coupling to the wall metal 401 through wire 41L. The LED 31 has a second electrode (not shown in the figure) electrically coupling to the bottom metal 402 through wire 41R. The lamp of FIG. 8A sheds lights in full direction when the LED 31 is energized by screwing the socket 40 onto a traditional electrical outlet.

FIG. 8B shows an LED chip used in FIG. 8A according to the invention.

FIG. 8B is an enlarge view to show the configuration of the chip 31 and the circuit board 30 of FIG. 8A. The chip 31 is mounted on the circuit board 30. The circuit board 30 has two through holes for metal leads 411, 412 to pass through. Each of the metal leads 411, 412 electrically couples to a first end of one of the two electrodes of the LED 31. A second end of each of the metal leads 411, 412 electrically couples to the wall metal 401 or the bottom metal 402 respectively. Insulation material 44 is optionally filled in the through holes for fixing the leads 411, 412.

FIG. 8C shows an LED lamp is used to replace the chip of FIG. 8B according to the invention.

FIG. 8C shows an LED lamp package 50 can be used to replace the chip 31 of FIG. 8B.

Figure 9:
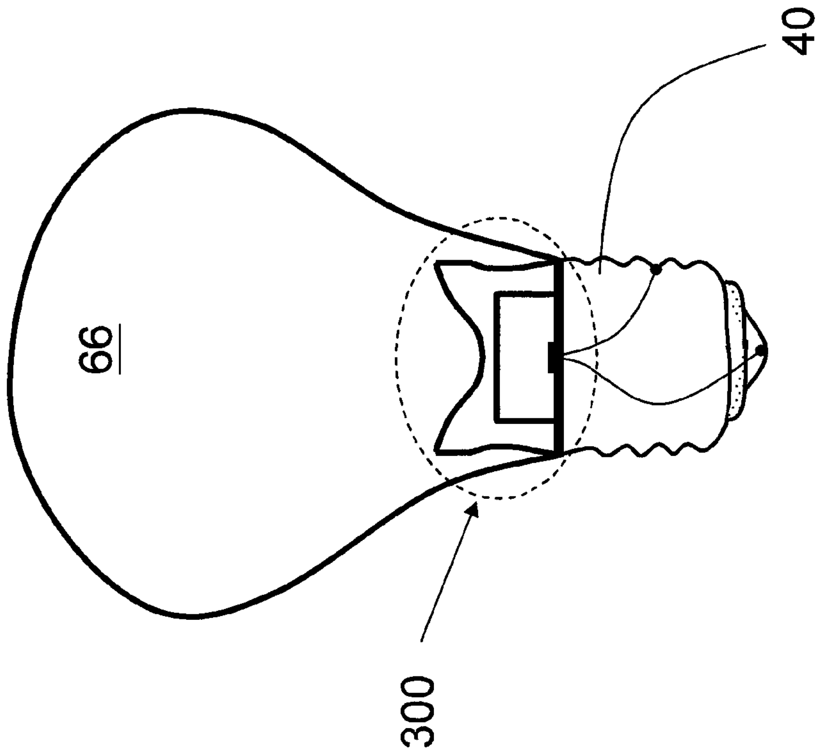
FIG. 9 shows a third embodiment of an omnidirectional LED lamp according to the invention.

FIG. 9 shows a third embodiment of an omnidirectional LED lamp according to the invention.

FIG. 9 shows that a glass bulb 66 is mounted on top of the socket 40. The LED lamp 300 is enclosed inside the glass bulb 66 to make the lamp package having a contour like a traditional lamp.

Figure 10:
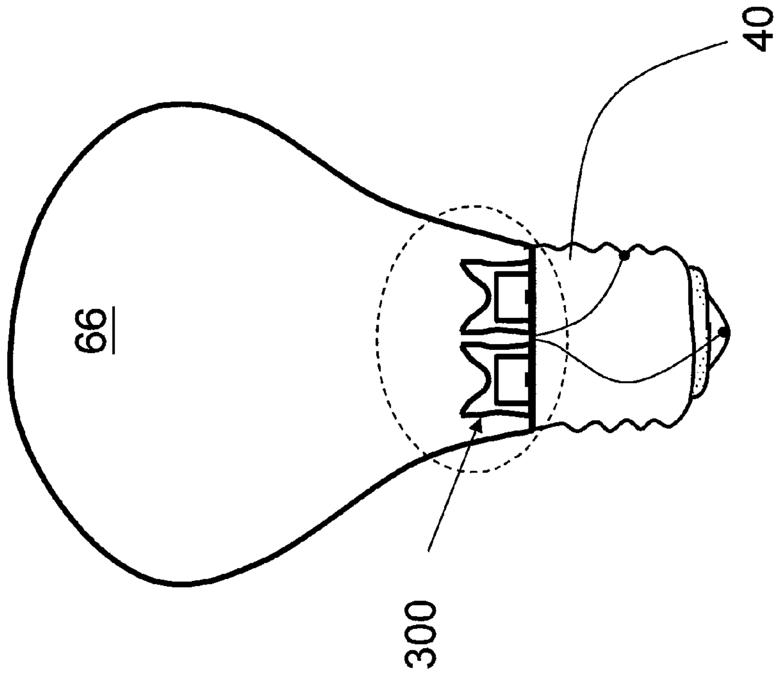
FIG. 10 shows modification embodiment to the product of FIG. 9

FIG. 10 shows modification embodiment to the product of FIG. 9

More than one of the LED lamp 300 can be used to enhance light intensity. FIG. 10 shows that two LED lamps 300 are enclosed inside the glass bulb 66 to enhance the light intensity.

While several embodiments have been described by way of example, it will be apparent to those skilled in the art that various modifications may be made without departing from the spirit of the present invention. Such modifications are all within the scope of the present invention, as defined by the appended claims.

What is claimed is:

1. An omnidirectional light emitting diode (LED) lamp, comprising:

an LED;

a complex lens, which has a unitary construction and comprises:

a top center lens, refracting a first group of light beams from said LED for a first fan-out area to illuminate top spaces of said lens;

a wing lens, surrounding and connected to said top center lens, reflecting a second group of light beams from said LED for a second fan-out area to cover side bottom spaces; and a tube lens, on bottom of said wing lens, refracting a third group of light beams from said LED for a third fan-out area to cover side top spaces;

wherein said top center lens is a concave lens, said wing lens is a total internal reflection lens, and said tube lens is a concave lens.

2. An LED lamp as claimed in claim 1, further comprising a base plate for carrying said LED.

3. An LED lamp as claimed in claim 2, wherein said base plate further comprising:

a first through hole and a second through hole;

a first lead, passing through said first through hole, electrically coupling to a first electrode of said LED; and a second lead, passing through said second through hole, electrically coupling to a second electrode of said LED.

4. An LED lamp as claimed in claim 3, further comprising:

a first insulation material, filled in said first through hole for fixing said first lead; and a second insulation material, filled in said second through hole for fixing said second lead.

5. An LED lamp as claimed in claim 2, further comprising:

a socket, configured under said base plate, further comprising:

a bottom metal, electrically coupling to a first electrode of said LED;

a wall metal, electrically coupling to a second electrode of said LED; and an insulation layer, configured in between said bottom metal and said wall metal.

6. An LED lamp as claimed in claim 5, further comprising a glass bulb configured on top of said socket.

7. An LED lamp as claimed in claim 1, wherein said LED is a chip.

8. An LED lamp as claimed in claim 1, wherein said LED is a lamp package.

9. A complex lens, comprising:

a top center concave lens;

a wing lens, having a property of total internal reflection, surrounding and connected to said top center lens; and a tube concave lens, on bottom of said wing lens;

wherein said complex lens has a unitary construction.

10. A light emitting diode (LED) lamp, comprising:

a glass bulb; and at least one omnidirectional LED lamp enclosed inside said glass bulb, said LED lamp comprising:

an LED;

a complex lens, which has a unitary construction and comprises:

a top center lens, refracting a first group of light beams from said LED for a first fan-out area to illuminate top spaces of said lens;

a wing lens, surrounding and connected to said top center lens, reflecting a second group of light beams from said LED for a second fan-out area to cover side bottom spaces; and a tube lens, on bottom of said wing lens, refracting a third group of light beams from said LED for a third fan-out area to cover side top spaces;

wherein said top center lens is a concave lens, said wing lens is a total internal reflection lens, and said tube lens is a concave lens.

* * * * *